(12) United States Patent
Helfand et al.

(10) Patent No.: US 8,380,816 B2
(45) Date of Patent: Feb. 19, 2013

(54) SYSTEM AND METHOD FOR MANAGING AND DISTRIBUTING BUNDLED CODE OBJECTS

(75) Inventors: Susan Helfand, Quakertown, PA (US);
Glenn Henderson, Perkasie, PA (US);
Arthur Jost, Mount Laurel, NJ (US)

(73) Assignee: General Instrument Corporation, Horsham, PA (US)

( * ) Notice: Subject to any disclaimer, the term of this patent is extended or adjusted under 35 U.S.C. 154(b) by 82 days.

(21) Appl. No.: 12/021,884

(22) Filed: Jan. 29, 2008

(65) Prior Publication Data
US 2009/0193098 A1 Jul. 30, 2009

(51) Int. Cl.
*G06F 15/16* (2006.01)
(52) U.S. Cl. ........................ 709/218; 717/173
(58) Field of Classification Search .................. 709/218; 717/173
See application file for complete search history.

(56) References Cited

U.S. PATENT DOCUMENTS

| | | | |
|---|---|---|---|
| 7,596,797 B1 * | 9/2009 | Kapner et al. | 725/46 |
| 2003/0163542 A1 * | 8/2003 | Bulthuis et al. | 709/208 |
| 2006/0020938 A1 * | 1/2006 | Elcock et al. | 717/178 |
| 2006/0294512 A1 * | 12/2006 | Seiden | 717/168 |

OTHER PUBLICATIONS

Office Action, Spanish App. No. 200900257 (Foreign Text and English Translation), Apr. 14, 2010.

* cited by examiner

*Primary Examiner* — Alina N Boutah
*Assistant Examiner* — Adam Cooney
(74) *Attorney, Agent, or Firm* — Stewart M. Wiener

(57) ABSTRACT

A method and apparatus for managing and distributing bundled code objects to, for example, set-top boxes serviced by a multi-service operator. The system and method creates different profiles, each including code objects, download conditions and so on. The different profiles are then combined in a code download bundle and the code download bundle is downloaded to a service center, which further distributes the bundle to a plurality of site servers which distribute the information in the bundle to the appropriate destinations, such as set-top boxes used with cable television service.

18 Claims, 4 Drawing Sheets

PROFILE DEFINITIONS 110

- PROFILE 1: DCT 2500 W/ VOD, CODE SUITE
  - PLATFORM 3.1.7, RATE 50/SEC
  - TVG A24, RATE 50/SEC
  - SEACHANGE VOD X.X RATE 50/SEC
  - ROW_ID() AND TIER_MATCH(AUTH_VOD,X)
- PROFILE 2: DCT 2500 W/O VOD, CODE SUITE
  - PLATFORM 3.1.7, RATE 50/SEC
  - TVG A24, RATE 50/SEC
  - ROW_ID() AND NOT TIER_MATCH(AUTH_VOD,X)
- PROFILE 3: DCT 6416 W/ VOD, CODE SUITE
  - PLATFORM 5.2, RATE 50/SEC
  - TVG A24, RATE 50/SEC
  - SEACHANGE VOD X.X RATE 50/SEC
  - ROW_ID() AND TIER_MATCH(AUTH_VOD,X)
- PROFILE 4: DCT 6416 W/O VOD, CODE SUITE
  - PLATFORM 5.2, RATE 50/SEC
  - TVG A24, RATE 50/SEC
  - ROW_ID() AND NOT TIER_MATCH(AUTH_VOD,X)
- PROFILE 5: DCH 6416 W/ VOD, CODE SUITE
  - PLATFORM 5.2, RATE 50/SEC
  - TVG A24, RATE 50/SEC
  - SEACHANGE VOD, RATE 50/SEC
  - ROW_ID() AND NOT TIER_MATCH(AUTH_VOD,X)

BUNDLE CONTENTS 112

- PLATFORM 3.1.7 OBJECT
- PLATFORM 3.1.7 DAT
- TVG A24 OBJECT
- TVG A24 DAT
- SEACHANGE OBJECT
- SEACHANGE DAT
- PLATFORM 5.2 OBJECT
- PLATFORM 5.2 DAT
- PROFILE1.XML
- PROFILE2.XML
- PROFILE3.XML
- PROFILE4.XML
- PROFILE5.XML
- PROFILE1-TEST.XML   ⎫
- PROFILE2-TEST.XML   ⎬ TEST PROFILES THAT INCLUDE A DECODER CONDITIONAL FOR CDL TEST PACKAGE ARE AUTOMATICALLY INCLUDED
- PROFILE3-TEST.XML   ⎪
- PROFILE4-TEST.XML   ⎪
- PROFILE5-TEST.XML   ⎭
- BUNDLE_XYZ_METADATA.XML

*FIG. 3*

SYSTEM AND METHOD FOR MANAGING AND DISTRIBUTING BUNDLED CODE OBJECTS

FIELD OF THE INVENTION

The present invention relates generally to a system and method for managing and distributing bundled code objects. More particularly, the present invention relates to a system and method for combining multiple code objects and download conditionals together in a code download bundle, and distributing the code download bundle to a plurality of destinations, such as set-top boxes used with cable television service.

BACKGROUND

As understood by one skilled in the art, set top boxes (STBs) are used by households to receive cable television from a multi-service operator (MSO), such as a cable television provider. Typically, a cable television provider provides programming content to the STBs over, for example, coaxial cable. From time to time, it becomes necessary or desirable to provide modifications or upgrades to the programming code that is installed in the STBs that are deployed at various locations throughout a region serviced by the MSO. The downloading of code is typically accomplished by having the MSO request a new code download to the remote project team (RPT) group. Each digital access controller (DAC) site within the MSO's region of service has various STB types to support its many customers, and each STB type requires multiple code objects to be downloaded. The RPT group thus will manually ensure that all code object types and versions are compatible with the STB types at each DAC site.

The RPT group will then order the numerous object files using a Digital Configuration Management (digital CM) site for the many different DAC sites owned by the MSO. Software can also be ordered directly by the MSO from the digital CM site via the Internet, but this is not typical. The software can be distributed to the DAC site using any suitable technique, such as file transfer protocol (FTP), or via compact disc (CD) or e-mail, for example.

That is, to distribute the software, the RPT group manually connects to the DAC site of interest and load software onto DAC site. The RPT group then, via the DAC, creates new source code, creates and associates decoder conditionals, creates new services, removes current code assignments, removes old code suite components, loads new code suite components, and builds new code assignments. The RPT can then provide these codes, etc., as test codes to each STB. If the test codes are determined to operate correctly, these test codes can be used as the updated codes by the STBs.

As can be appreciated by one skilled in the art, these steps are redundant for most DAC sites, and are typically time consuming and considered prone to error because they are performed manually.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 illustrates an example of profile definitions and bundle contents as handled by the system shown in FIG. 1.

Figure 1:
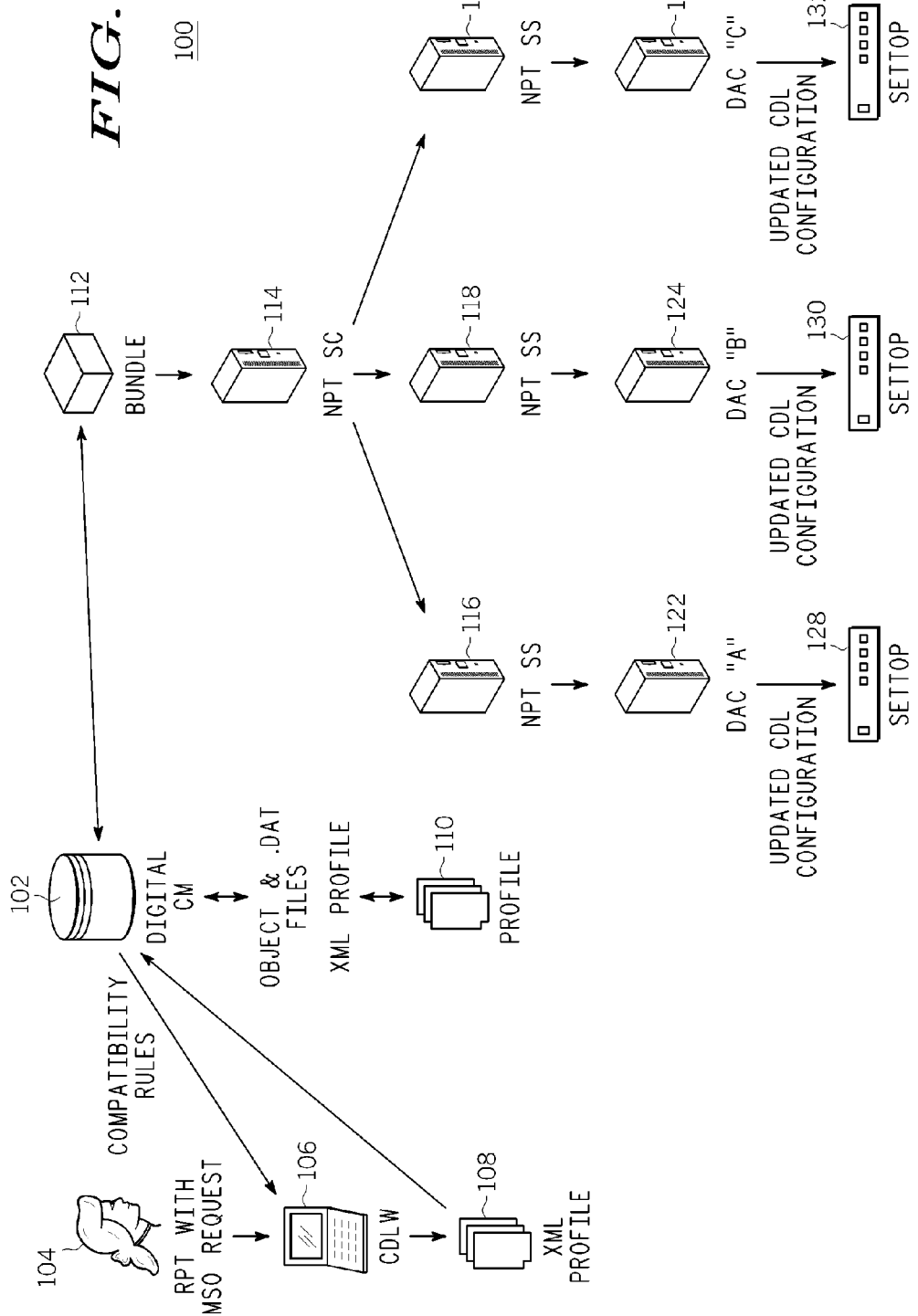
FIG. 1 is a block diagram illustrating an example of a system for managing and distributing bundled code objects in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for managing and distributing bundled code objects. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for managing and distributing bundled code objects described herein. The non-processor circuits may include, but are not limited to, a radio receiver, a radio transmitter, signal drivers, clock circuits, power source circuits, and user input devices. As such, these functions may be interpreted as steps of a method for managing and distributing bundled code objects. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A system and method for managing and distributing bundled code objects according to an embodiment of the present invention will now be described with regard to FIGS. 1 through 4. As will be appreciated from the following, the system and method operate to streamline code downloading and shorten the full deployment cycle of code downloads, thus increasing stability, reducing risk, reducing the duration of the process during code roll outs, and reducing overall cost for deployment.

As can be appreciated by one skilled in the art, typical code deployment scenario consists of lab test, headend test, employee test, customer test, and full deployment where code is distributed to all STB's in all sites using the methodology as performed by the embodiments of the present invention as described below. Test timelines are driven by individual MSO's and can vary from site to site.

FIG. 1 illustrates an example of a network 100 in which the system and method according to an embodiment of the present invention can be employed and performed. As indicated, a digital CM system 102 can communicate with a computer 106 that is used by an RPT 104 which, for example, receives a request for code download from an MSO. The computer 106 can be running a program referred to as a "code download wizard" (CDLW) that generates a CDLW profile which is a physical file that contains the code and data object names along with the defined decoder conditional to be used by the DACs serviced by the MSO 104 for code download purposes.

That is, as further illustrated, the network 100 includes at least one Network Performance Tool service center (NPT SC) 114 that distributes, for example, code to a plurality of Network Performance Tool site servers (shown as NPT SS 116 through 120) that are associated with one or more DAC (shown as DACs 122 through 126), which in turn provide the code to one or more respective STBs (shown as STBs 128 through 132). It is noted that an STB can also be an advanced STB (ASTB) as can be appreciated by one skilled in the art. Typically, a DAC is a physical device with multiple applications which are responsible for adding and defining headend devices (e.g., STBs), managing a schedule of services and programs, defining channel map assignments, controlling encryption devices, performing STB polling for interactive pay per view (IPPV) collection, interfacing to the billing system of the MSO, and configuring and performing code download to associated STBs.

It should also be noted that each STB 128-132 and each DAC 122-126 includes a code suite. In an STB 128-132, a code suite can be referred to as a logical grouping of code objects used for providing a defined set of video and interactive services to the subscriber. Such a code suite can be comprised of either a platform code object or a system object and zero or more managed/application objects. In a DAC 122-126, a code suite can be referred to as a logical grouping of code objects/background service pairs, which are to be used in code download for downloading the entire group of objects. Such a code suite can be comprised of either a platform code object or a system object and zero or more managed/application objects.

An example of a code download process performed by the system and method according to an embodiment of the present invention will now be described.

Figure 2:
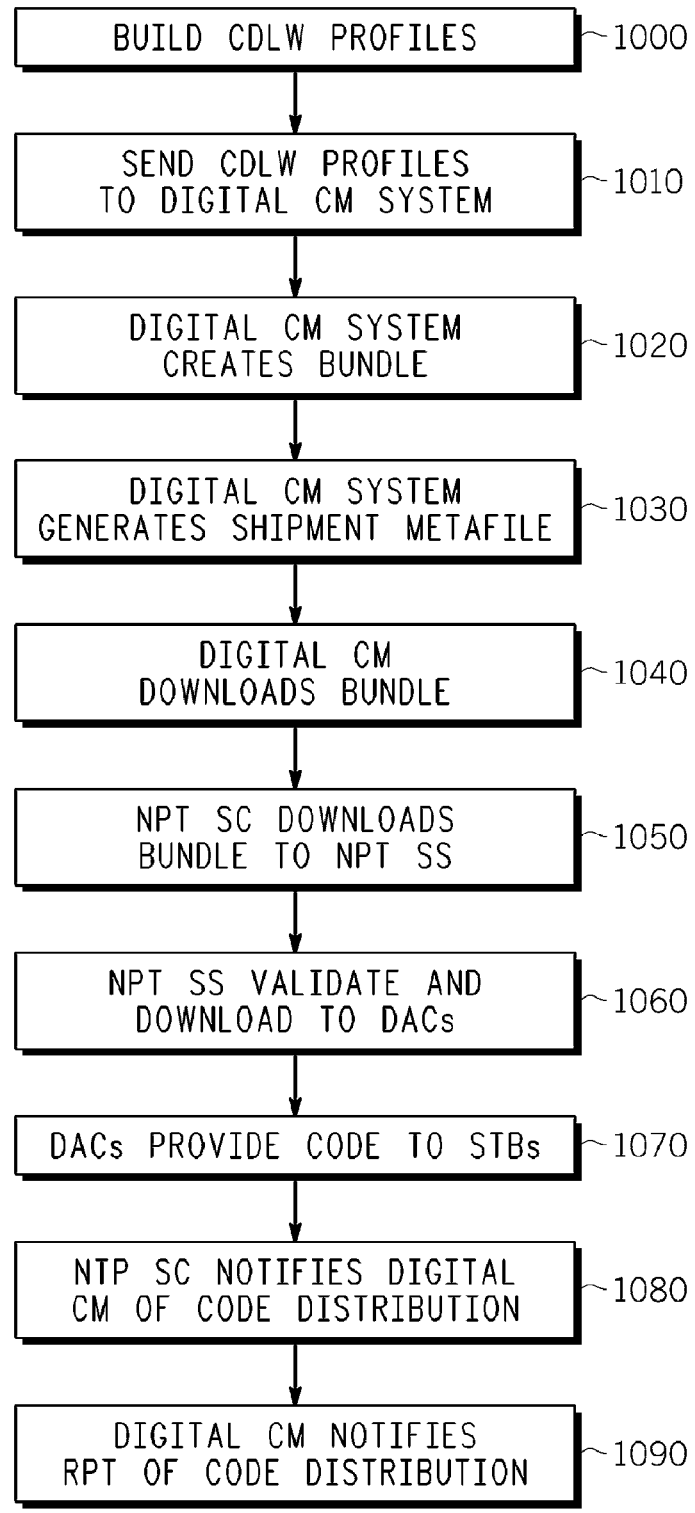
FIG. 2 is a flowchart illustrating an example of operations performed by the system as shown in FIG. 1.

As shown in the flowchart of FIG. 2, when a code update is available for the STBs, the process begins in step 1000 with the CDLW being used by the RPT 104 as requested by the MSO to build CDLW profiles (e.g., XLM XML profiles 108) including, for example, predetermined valid combinations of specific firmware and set-top applications. The compatibility between a firmware, applications, and objects are maintained in the digital CM system 102. Also, multiple CDLW profiles can be generated for a single MSO to cover various possible STB scenarios that occur for a site. The compatibility between a firmware, applications, and objects are maintained in the digital CM system 102. Some examples of a CDLW Profile would be the necessary objects and the download conditionals for the following: core STB's using, for example, SeaChange International's (hereinafter "SeaChange") video on demand (VOD) for a test population; core STB's using SeaChange VOD for general availability; advanced set top boxes (ASTB's) using Sea Change VOD for a test population; ASTB's using SeaChange VOD for general availability; non-VOD core STB's for a test population; non-VOD core STB's for general availability; non-VOD ASTB's for a test population; non-VOD ASTB's for general availability; core STB's using Concurrent Computer Corporation's (hereinafter "Concurrent") VOD for a test population; core STB's using concurrent VOD for general availability; ASTB's using concurrent VOD for a test population; and ASTB's using Concurrent VOD for general availability, to name a few. It is noted that the digital CM system 102 can track the building of the CDLW profiles 108. Each profile 108 has a unique identifier and a version number, and any changes to the profile 108 causes a new version number to be assigned.

In step 1010, these CDLW profiles 108 are then sent to the digital CM system 102 where they are version controlled for inclusion into the database of the digital CM system 102 and referred to as a profile 110. When a network 100 has multiple DAC's as shown, for example, in FIG. 1, and thus has multiple profiles 110, the digital CM system 102 in step 1020 can combine the multiple profiles into a single bundle 112 to reduce the overall number of deployments necessary to the various DACs 122-126. The digital CM system 102 can create a bundle by selecting profile(s) 110 or objects for inclusion into, for example, a VOD generic bundle (bundle 112), and then names the bundle 112 and saves the named bundle 112 in, for example, the database associated with the digital CM system 102. Each bundle 112 has a unique identifier and a version number, and any changes to the bundle 112 causes a new version number to be assigned.

For instance, as shown in FIG. 3, each profile 110 (e.g., Profile 1, Profile 2, etc.) can include a specific CDLW profile 108 and the objects named in the CDLW profile 108, such as the CDLW profile file generated by the CDLW, code objects, data objects, and the appropriate DAT files associated with the objects. As understood by one skilled in the art, a DAT file can be the object data file that describes the distinguishing characteristics of a particular code object. One bundle 112 could be created for deployment to all SeaChange STBs and ASTBs. Similarly, one bundle could be created for deployment to all Concurrent STBs and ASTBs, and one or more bundles could be created for "other" VOD vender STBs and ASTBs. These bundles 112 are used to deliver the code objects and CDLW files for test profiles and full deployment profiles, VOD and non-VOD profiles, core and ASTB profiles.

Figure 4:
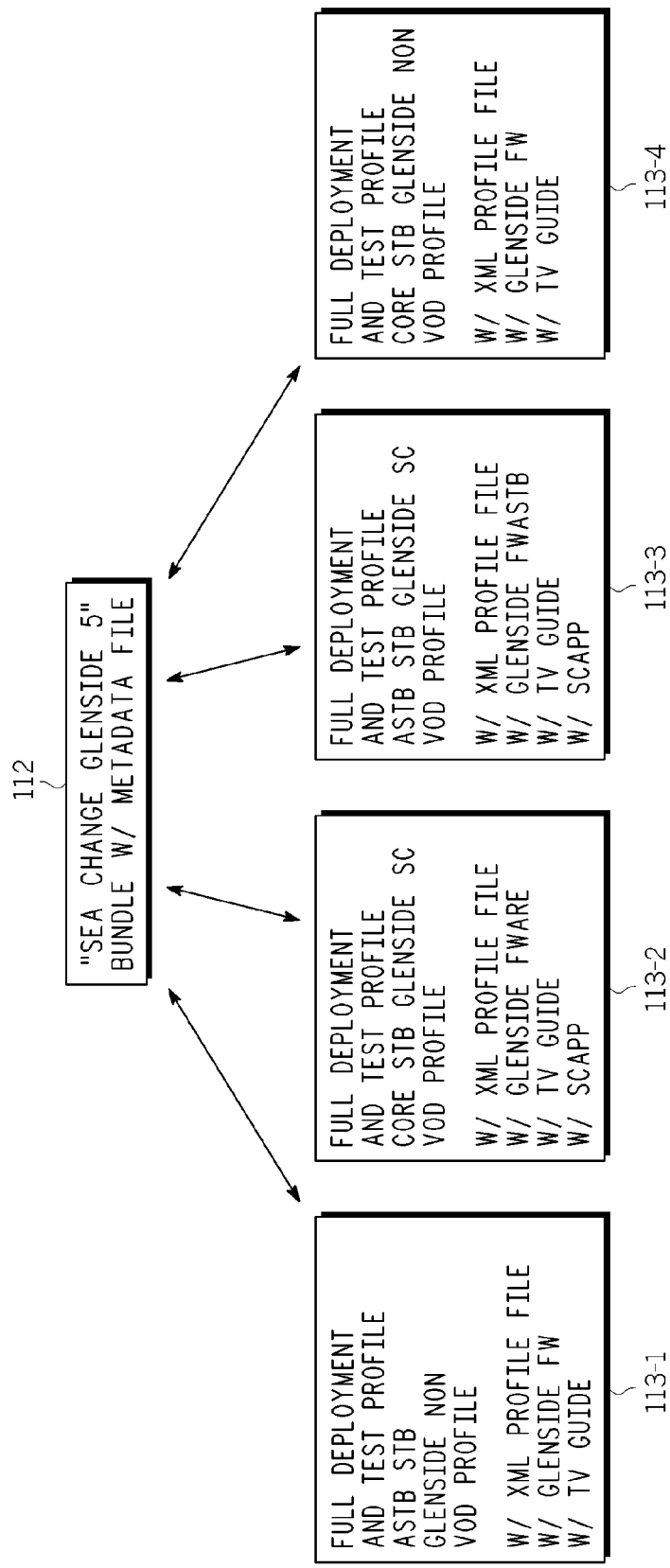
FIG. 4 illustrates a further example of a bundle as handled by the system as shown in FIG. 1.

In the further examples of bundles shown in FIG. 4, Bundle "Sea Change Glenside 5" (identified as a bundle 112) could include the profiles necessary for all SeaChange sites for ASTB's using Non-VOD profiles as shown in group 113-1, core STB's using SC VOD profiles as shown in group 113-2, ASTB's using SC VOD profiles as shown in group 113-3, and core STB's using Non-VOD profiles as shown in group 113-4, for example. Bundle "Glenside 5 CC" (not shown) could include the profiles necessary for all Concurrent sites for core STB's using Concurrent VOD, ASTB's using Concurrent VOD, core STB's using Non-VOD; ASTB's using Non VOD, and so on.

When a bundle 112 is to be delivered to the NPT SS 116-120, the digital CM system 102 in step 1030 generates a shipment metadata file which identifies the object and profile(s) included in bundle 112 for shipment. In step 1040, the digital CM system 102 downloads bundle 112 to the NPT SC 114 which, for example, acts as an intermediate site for further distribution of the bundle 112 to the NPT SS 116-120 associated with the DACs 122-126.

In step 1050, the NPT SC 114 reads the bundle 112 and sends (e.g., pushes) the bundle 112 to the NPT SS 116-120, which act as further intermediate sites. In step 1060, the NPT SS 116-120 validates the metadata file, for example, with the specific site parameters, and downloads (e.g., pushes) the necessary files (e.g., the object and profiles included in the bundle) to the DACs 122-126 as appropriate based on information in the bundle 112. Such information can include code assignments defining multiple attributes of the download object (e.g., destination, download or decoder conditionals, object name, schedule information, timeout, transmission rate, group, description, and so on). As understood by one skilled in the art, decoder conditionals are expressions used during a code download which enable a DAC 122-126 to target specific STB types for each downloaded object, and associate STB types with downloadable objects by creating or removing associations between them. Once received by the DACs 122-126, the DACs 122-126 can provide the updated code in the bundle 112 to their associated STBs 128-132 in step 1070. Also, in step 1080, the NTP SC 114 can notify the digital CM system 102 that the bundle 112 has been distributed, and in step 1090, the digital CM system 102 can notify the RPT 104, which can in turn notify the MSO, that the bundle 112 has been distributed.

The above process can be repeated each time a code update is to be performed.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for distributing code download profile files to destination sites, the method comprising:
    creating a plurality of code download profile files, at a site server, for a plurality of multi-service operators (MSOs), each one of the plurality of code download profile files including XML for a download conditional for at least one information file of a code suite;
    sending the plurality of code download profile files, from the site server, to a configuration management (CM) site server; and
    operating the CM site server to arrange one or more of the plurality of code download profile files created for a single MSO, and the at least one information file corresponding to each of the one or more of the plurality of code download profile files, into a bundle for the single MSO;
    operating the CM site server to send the bundle to a service center comprising an intermediate site server, the bundle for use by the intermediate site server in distributing the information files of the bundle, via one or more further intermediate site servers, to a plurality of digital access controllers, wherein the intermediate site server and each digital controller is configurable by destination site information in the bundle to distribute the information files to a plurality of the destination sites.

2. The method of claim 1, further comprising:
    operating the intermediate site server to access the destination site information in the bundle and, based on the destination site information, send the bundle to the plurality of further intermediate site servers, each of the further intermediate site servers operable to send, based on attributes included in the destination site information of the bundle, targeted information files of the bundle to at least one of the plurality of digital access controllers, for further distribution of the targeted information files of the bundle to the destination sites.

3. The method of claim 2, further comprising:
    operating each said further intermediate site server to access the destination site information in the bundle and to send, based on attributes included in the destination site information of the bundle, at least one of the targeted information files, via a digital access controller associated with the further intermediate site server, to at least one of the destination sites associated with that said further intermediate site server.

4. The method of claim 3, wherein:
    the step of operating each said further intermediate site server includes operating each said further intermediate site server to send different information files of the bundle to different said destination sites, via the digital access controller associated with the further intermediate site server, based on the destination site information in the bundle.

5. The method of claim 1, wherein:
    the step of creating the plurality of profile files is performed manually; and
    the CM site server includes a digital configuration management system that is operable to create the bundle.

6. The method of claim 5, wherein:
    the destination sites include set-top boxes for receiving television signals, and the information files of the bundle include information for controlling operation of the set-top boxes.

7. The method of claim 1, wherein:
    the bundle further comprises a metadata file describing contents of the bundle; and
    the information files of the bundle include object files and data files.

8. A system for distributing a plurality of information files to destination sites, the system comprising:
    a first site server operable for creating a plurality of code download profile files for a plurality of multi-service operators (MSOs), each one of the plurality of code download profile files including XML for a download conditional for at least one information file of a code suite;

a second site server operable for receiving the plurality of code download profile files from the first site server, and arranging one or more of the plurality of code download profile files created for a single MSO, and the at least one information file corresponding to each of the one or more of the plurality of code download profile files, into a bundle for the single MSO;

the second site server further operable for sending the bundle to a service center comprising an intermediate third site server, the bundle for use by the intermediate third site server in distributing the information files of the bundle, via one or more further intermediate site servers, to a plurality of digital access controllers, wherein the intermediate third site server and each digital access controller is configurable by destination site information in the bundle to distribute the information files to a plurality of the destination sites;

wherein the first site server comprises a first processor, the second site server comprises a second processor, the intermediate third site server comprises a third processor, and the further intermediate site servers each comprise a further processor.

9. The system of claim 8, further comprising:

the intermediate third site server and the one or more further intermediate site servers; and wherein:

the intermediate third site server operates to access the destination site information in the bundle and, based on the destination site information, send the bundle to the plurality of further intermediate site servers; and each of the further intermediate site servers operates to send, based on attributes included in the destination site information of the bundle, targeted information files of the bundle to at least one of the plurality of digital access controllers, for further distribution of the targeted information files of the bundle to the destination sites.

10. The system of claim 9, wherein:

each of the further intermediate site servers operates to send different information files of the bundle to different said destination sites, via a digital access controller associated with the further intermediate site server, based on the destination site information in the bundle.

11. The system of claim 8, wherein:

the first site server receives information from a multi-service operator for television service to create the plurality of code download profile files; and the second site server includes a digital configuration management system that operates to create the bundle.

12. The system of claim 11, wherein:

the destination sites include set-top boxes for receiving television signals, and the information files include information for controlling operation of the set-top boxes.

13. The system of claim 8, wherein:

the code suite comprises zero or more application objects, and at least one of the group consisting of a platform code object and a system object.

14. At least one non-transitory computer-readable medium of instructions for controlling computers to distribute a plurality of information files to destination sites, the at least one non-transitory computer-readable medium of instructions comprising:

a first set of instructions for controlling a first computer to create a plurality of code download profile files for a plurality of multi-service operators (MSOs), each one of the plurality of code download profile files including XML for a download conditional for at least one information file of a code suite, and for controlling the first computer to send the plurality of code download profile files to a second computer; and a second set of instructions for controlling the second computer to arrange one or more of the plurality of code download profile files created for a single MSO, and the at least one information file corresponding to each of the one or more of the plurality of code download profile files, into a bundle for the single MSO, and for controlling the second computer to send the bundle to a service center comprising an intermediate site server, the bundle for use by the intermediate site server in distributing the information files of the bundle, via one or more further intermediate site servers, to a plurality of digital access controllers, wherein the intermediate site server and each digital access controller is configurable by destination site information in the bundle to distribute the information files to a plurality of the destination sites.

15. The method of claim 1 wherein:

the code suite comprises zero or more application objects, and at least one of the group consisting of a platform code object and a system object.

16. The method of claim 1 wherein each one of the plurality of code download profile files further comprises a transmission rate value.

17. The method of claim 1 wherein the step of creating a plurality of code download profile files further comprises receiving from the CM site server compatibility rules for compatibility of a firmware, applications, and objects.

18. The system of claim 8 wherein:

the code suite comprises zero or more application objects, and at least one of the group consisting of a platform code object and a system object.

* * * * *